USO12001798B2

(12) United States Patent
Liu et al.

(10) Patent No.: US 12,001,798 B2
(45) Date of Patent: Jun. 4, 2024

(54) GENERATION OF TRAINING DATA FOR MACHINE LEARNING BASED MODELS FOR NAMED ENTITY RECOGNITION FOR NATURAL LANGUAGE PROCESSING

(71) Applicant: Salesforce, Inc., San Francisco, CA (US)

(72) Inventors: Jingyuan Liu, Sunnyvale, CA (US); Abhishek Sharma, Fremont, CA (US); Suhail Sanjiv Barot, San Mateo, CA (US); Gurkirat Singh, Elk Grove, CA (US); Mridul Gupta, San Mateo, CA (US); Shiva Kumar Pentyala, Austin, TX (US); Ankit Chadha, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 288 days.

(21) Appl. No.: 17/202,188

(22) Filed: Mar. 15, 2021

(65) Prior Publication Data

US 2022/0222489 A1 Jul. 14, 2022

Related U.S. Application Data

(60) Provisional application No. 63/136,831, filed on Jan. 13, 2021.

(51) Int. Cl.
*G06F 40/295* (2020.01)
*G06F 18/214* (2023.01)
(Continued)

(52) U.S. Cl.
CPC .......... *G06F 40/295* (2020.01); *G06F 18/214* (2023.01); *G06F 40/247* (2020.01);
(Continued)

(58) Field of Classification Search
CPC .... G06F 20/295; G06F 20/247; G06F 40/284; G06F 40/35
See application file for complete search history.

(56) References Cited

U.S. PATENT DOCUMENTS 9,009,134 B2 * 4/2015 Xu .................. G06F 16/951
707/731
9,116,940 B1 * 8/2015 Gupta ............... G06F 16/2272
(Continued)

FOREIGN PATENT DOCUMENTS

CN 112199511 A * 1/2021 ........... G06F 16/353

OTHER PUBLICATIONS

Carreras, X. et al., "A Simple Named Entity Extractor using AdaBoost," CONLL '03: Proceedings of the seventh conference on Natural language learning at HLT-NAACL 2003—vol. 4, May 2003, pp. 152-155.
(Continued)

*Primary Examiner* — Anne L Thomas-Homescu
(74) *Attorney, Agent, or Firm* — Haynes and Boone, LLP

(57) ABSTRACT

A system performs named entity recognition for performing natural language processing, for example, for conversation engines. The system uses context information in named entity recognition. The system includes the context of a sentence during model training and execution. The system generates high quality contextual data for training NER models. The system utilizes labeled and unlabeled contextual data for training NER models. The system provides NER models for execution in production environments. The system uses heuristics to determine whether to use a context-based NER model or a simple NER model that does not use context information. This allows the system to use simple NER models when the likelihood of improving the accuracy of prediction based on context is low.

20 Claims, 9 Drawing Sheets

(51) Int. Cl.
    *G06F 40/247* (2020.01)
    *G06F 40/284* (2020.01)
    *G06F 40/35* (2020.01)
    *G06N 3/08* (2023.01)
    *G06N 20/00* (2019.01)
    *H04L 51/02* (2022.01)

(52) U.S. Cl.
    CPC ............ *G06F 40/284* (2020.01); *G06F 40/35* (2020.01); *G06N 3/08* (2013.01); *G06N 20/00* (2019.01); *H04L 51/02* (2013.01)

(56) References Cited

U.S. PATENT DOCUMENTS

| | | | | |
|---|---|---|---|---|
| 9,613,004 | B2* | 4/2017 | Liang | G06F 40/10 |
| 9,946,789 | B1* | 4/2018 | Li | G06F 16/93 |
| 10,607,042 | B1* | 3/2020 | Dasgupta | G06F 40/253 |
| 10,769,374 | B1 | 9/2020 | Chen et al. | |
| 10,929,392 | B1* | 2/2021 | Cheng | G06N 3/08 |
| 11,321,538 | B1* | 5/2022 | Fontecilla | G06F 18/213 |
| 11,423,897 | B1* | 8/2022 | Levy | G06F 40/56 |
| 11,580,379 | B1* | 2/2023 | Leen | G06F 9/54 |
| 2010/0010960 | A1* | 1/2010 | Singh | G06F 16/2456 |
| | | | | 707/E17.005 |
| 2011/0131205 | A1* | 6/2011 | Iyer | G06F 16/3334 |
| | | | | 707/E17.064 |
| 2013/0055372 | A1* | 2/2013 | Chao | H04L 63/0846 |
| | | | | 726/7 |
| 2014/0278362 | A1* | 9/2014 | Gerken, III | G06F 16/367 |
| | | | | 704/10 |
| 2017/0039176 | A1* | 2/2017 | Broderick | G06F 40/197 |
| 2018/0004843 | A1* | 1/2018 | Koperski | G06F 16/951 |
| 2018/0225281 | A1* | 8/2018 | Song | G06N 5/02 |
| 2019/0012302 | A1 | 1/2019 | MacMahon et al. | |
| 2019/0065576 | A1* | 2/2019 | Peng | G06F 16/285 |
| 2019/0180195 | A1* | 6/2019 | Terry | G06F 40/295 |
| 2019/0180196 | A1* | 6/2019 | Terry | G06F 40/56 |
| 2019/0251169 | A1 | 8/2019 | Loghmani | |
| 2020/0067861 | A1* | 2/2020 | Leddy | G06F 21/6245 |
| 2020/0111021 | A1* | 4/2020 | Keyngnaert | G06N 20/20 |
| 2020/0279159 | A1* | 9/2020 | Iwakura | G06N 3/044 |
| 2020/0285683 | A1* | 9/2020 | David | G06F 40/30 |
| 2020/0349919 | A1 | 11/2020 | Wanas et al. | |
| 2020/0364412 | A1* | 11/2020 | Cheng | G06N 3/08 |
| 2020/0401794 | A1* | 12/2020 | Ishii | G06V 40/174 |
| 2021/0026924 | A1* | 1/2021 | Jones | G06F 40/56 |
| 2021/0064821 | A1* | 3/2021 | Seth | G06F 40/289 |
| 2021/0157872 | A1* | 5/2021 | David | G06F 40/279 |
| 2021/0216577 | A1* | 7/2021 | Xiao | G06F 16/3347 |
| 2021/0224486 | A1* | 7/2021 | Stabler | G06N 3/02 |
| 2021/0248321 | A1* | 8/2021 | Cheng | G06F 40/295 |
| 2021/0274255 | A1* | 9/2021 | Aher | H04N 21/462 |
| 2021/0334459 | A1* | 10/2021 | Dvijotham | G06F 40/247 |
| 2021/0365640 | A1* | 11/2021 | Kang | G06F 18/214 |
| 2021/0365837 | A1* | 11/2021 | Kashihara | G06F 16/358 |
| 2022/0121633 | A1* | 4/2022 | Quader | G06F 16/213 |
| 2022/0121710 | A1* | 4/2022 | Rosenthal | G06F 16/90332 |
| 2022/0269939 | A1* | 8/2022 | Zhao | G06N 3/042 |
| 2022/0277143 | A1* | 9/2022 | Jayarao | G06F 40/30 |
| 2022/0277290 | A1* | 9/2022 | Roongta | G06Q 20/4014 |

OTHER PUBLICATIONS

Nadeau, D. et al., "A survey of named entity recognition and classification," Lingvisticæ Investigationes 30(1), Aug. 2007, pp. 1-20.

Poibeau, T. et al., "Proper Name Extraction from Non-Journalistic Texts," Mar. 9, 2001, pp. 1-14.

Ritter, A. et al., "Named Entity Recognition in Tweets: An Experimental Study," Proceedings of the 2011 Conference on Empirical Methods in Natural Language Processing, Jul. 2011, pp. 1524-1534.

United States Office Action, U.S. Appl. No. 17/202,183, dated Dec. 23, 2022, 13 pages.

* cited by examiner

GENERATION OF TRAINING DATA FOR MACHINE LEARNING BASED MODELS FOR NAMED ENTITY RECOGNITION FOR NATURAL LANGUAGE PROCESSING

CROSS-REFERENCES TO RELATED APPLICATIONS

This application claims the benefits of U.S. Provisional Application No. 63/136,831, filed on Jan. 13, 2021, which is incorporated by reference in its entirety.

BACKGROUND

Field of Art

The disclosure relates in general to machine learning based natural language processing, and more specifically to generating training data set for machine learning based named entity recognition for natural language processing.

Description of the Related Art

Named entity recognition (NER) is a commonly used operation performed by many natural language processing (NLP) tasks. Named entity recognition is used in NLP services such as conversational BOTs that allow users to interact with online systems using unstructured text, for example, natural language sentences.

Named entity recognition is performed using linguistic grammar-based techniques as well as machine learning based models such as neural networks. Machine learning based techniques for NER typically require a large amount of manually annotated training data. This requires significant resources in obtaining the training data. Furthermore, trained machine learning based models for performing named entity recognition have lower accuracy in production since they are trained using training data that is different from real conversations. For example, real conversations may include short utterances such as single word responses. Conventional techniques typically fail to perform accurate named entity recognition in such situations.

Figure 1:
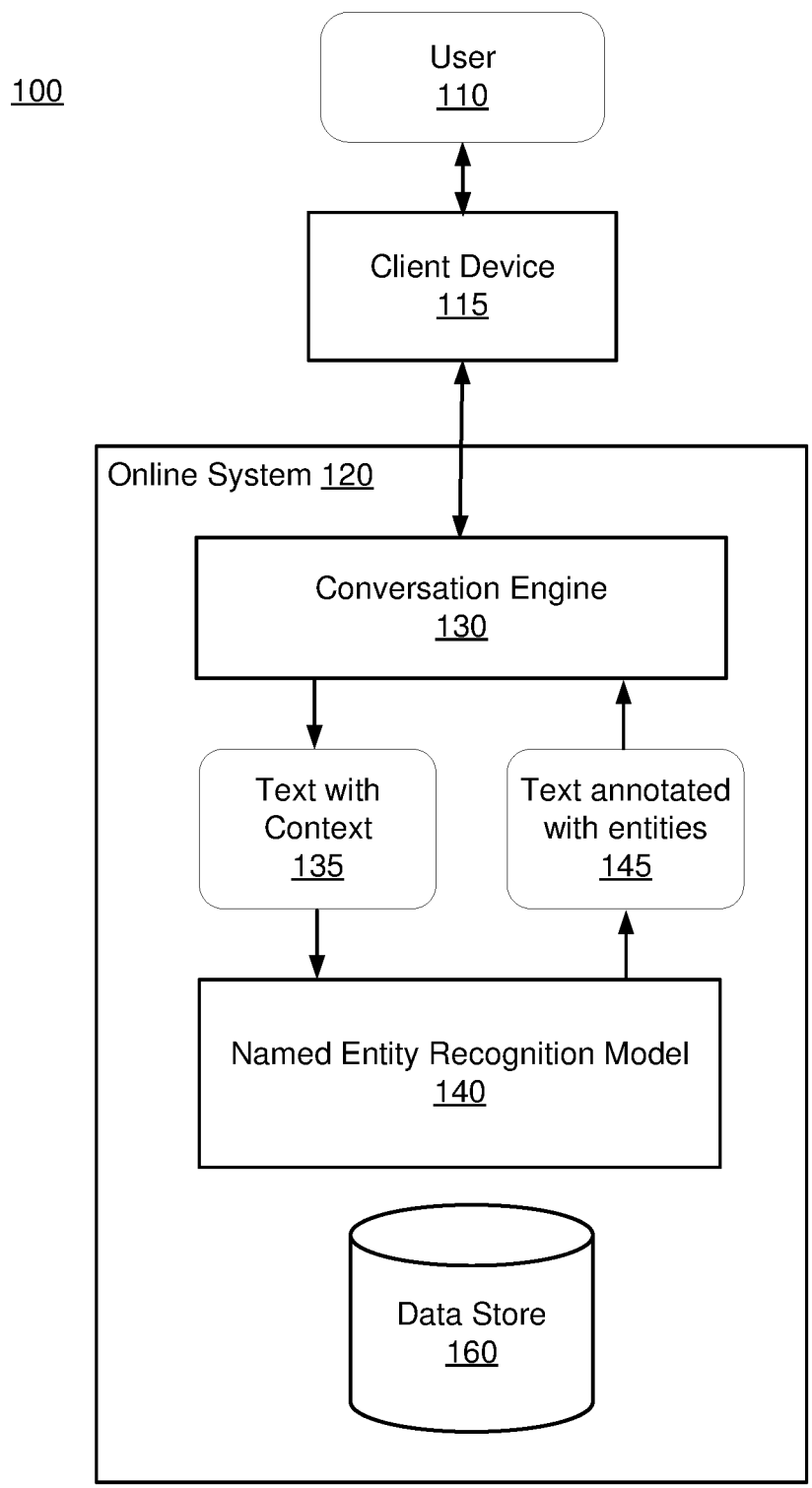
FIG. 1 is a block diagram of a system environment illustrating use of an NER model in a conversation engine, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

DETAILED DESCRIPTION

Named entity recognition (NER) models are used for various natural language processing tasks, for example, in chatbots or conversation engines. Conversational engines or allow users to interact with web services through text or speech. During a conversation between the chatbot and a user, an NER model is invoked to help extract entity information and formalize free text to structured text. The structured text is further processed by the system, for example, to determine the user intent and to automatically generate a response for providing to the user.

Named entity recognition is also referred to as named entity identification or entity extraction. Named entity recognition includes locating and classifying named entities mentioned in unstructured text into pre-defined categories such as person names, organizations, locations, time expressions, quantities, monetary values, percentages, and so on. An example of unstructured text is an utterance referring to a sentence, a phrase, or a group thereof.

Existing techniques for NER perform fail to perform accurate named entity recognition in various situations. For example, when the chatbot asks the user: "what's your name?", and the user replies: "April". In this scenario, conventional NER models may fail to determine that "April" is a name of a person for various reasons. This is so, because most NER models are trained using public open datasets. These training datasets typically have full sentences. Conventional NER models typically learn from other words within the sentence to help identify the entity. However, in typical interactions with chatbots, user reply may have very short sentences, for example single word utterances. During the training phase, the NER model may never see such short answer data. A typical NER model may mis-classify the word "April" as a time expression or date since most training datasets typically include a Date entity "April." However, in the above example, "April" is the name of a person.

Embodiments use context information in named entity recognition. Embodiments include the context of a sentence during NER model training and execution. The system according to various embodiments generates high quality contextual data for training NER models. The system utilizes labeled and unlabeled contextual data for training NER models. The NER models are provided for execution in production environments. The system uses heuristics to determine whether to use a context-based NER model or a simple NER model that does not use context information.

Context information helps the system determine the intent of an utterance and boosts the performance for named entity recognition. Accordingly, the accuracy of the context-based NER model is higher than conventional NER models, thereby allowing the online system 120 to determine the named entities in a sentence of phrase more accurately.

Although applications of NER are described in connection with conversational engines, the techniques disclosed are not limited to conversational engines but can be applied to other domains. For example, analysis of documents that processes an unstructured document and annotates it with additional information describing various keywords that occur within the document.

System Environment

FIG. 1 is a block diagram of a system environment illustrating use of an NER model in a conversation engine, according to one embodiment. The system environment 100 includes an online system 120 that communicates with users via client devices 115. The online system 120 includes a conversation engine 130, a named entity recognition model 140, and a data store 160. The online system 120 may include other components not shown in FIG. 1, for example, various applications, other types of data stores, and so on. The system environment 100 may include other elements not shown in FIG. 1, for example, a network.

The conversation engine 130 stores the instructions that allow the online system 120 to perform natural language conversations with users 110. A conversation engine may also be referred to as a chatbot, a dialog system, virtual assistant, or artificial intelligence (AI) assistant. The conversation engine 130 receives a natural language request from a user and determines the action that the user requested via the natural language request. The conversation engine 130 uses the named entity recognition model 140 for performing NER tasks for use in analyzing user utterances to determine how to respond to user utterances. During a conversation between the conversation engine 130 and user, the conversation engine 130 invokes NER model 140 to perform NER for extracting key information from user utterances and to formalize free text in user utterances to structured text.

The conversation engine 130 determines a context based on the current conversation with a user. The context of a conversation is represented by a sequence of recent utterances that may have been provided by the user or automatically generated by the online system 120. The conversation engine 130 analyzes a natural language text by combining the text with the context to obtain a combined string 135. The combined string 135 is provided as input to the named entity recognition model 140. The named entity recognition model 140 provides an output text 145 annotated with entity information. The named entity recognition model 140 may remove the context from the combined string 135. The output text 145 annotated with entity information is used by the conversation engine 130 for further processing. For example, if the input text was an utterance from a user, the conversation engine 130 may use the entity information to accurately determine an intent of the user. Accordingly, the conversation engine 130 may analyze the utterance based on the entity information to determine a type of information that the user may be requesting. The conversation engine 130 may perform processing to determine the information and provide to the user as a generated response.

In some embodiments, the online system 120 is a multi-tenant system that stores data of multiple tenants. Chatbots are often used by multi-tenant systems to allow tenants of the multi-tenant systems to configure chatbots for specific purposes. Each tenant may be an enterprise. For example, a tenant may be a company that employs people that use the multi-tenant system to manage their processes. A multi-tenant system may store data for multiple tenants in the same physical database but enforce a logical separation of data across tenants. As a result, one tenant does not have access to another tenant's data, unless such data is expressly shared.

The online system 120 stores data in data store 160 that may be processed in order to respond to requests from users. For example, a permitted action may update data stored in data store 160, search for data stored in data store 160, and so on. The data store 160 stores data for users of the multi-tenant system. In an embodiment, the data store 160 stores information describing entities represented in the multi-tenant system. Each entity has an entity type. Each entity stores values in fields or data fields. Examples of entity types include account, case, opportunity, and so on. An entity representing an account stores information describing a user or an enterprise; an entity representing an opportunity represents a potential customer and stores fields representing information identifying the potential customer, a status of the opportunity, the last interaction with the potential customer; an entity representing a case stores information describing an interaction between an enterprise and a customer and stores fields comprising the date of the interaction, the type of the interaction, and other details of the interaction.

The data store 160 may be implemented as a relational database storing one or more tables. Each table contains one or more data categories logically arranged as columns or fields. Each row or record of a table contains an instance of data for each category defined by the fields. For example, a data store 160 may include a table that describes a customer with fields for basic contact information such as name, address, phone number, fax number, etc. Another table might describe a purchase order, including fields for information such as customer, product, sale price, date, etc.

In an embodiment, multi-tenant system implements a web-based customer relationship management (CRM) system. For example, the multi-tenant system may include application servers configured to implement and execute CRM software applications as well as provide related data, code, forms, webpages and other information to and from client devices 115 and to store to, and retrieve from, a database system related data, objects, and webpage content.

The online system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc.

The client devices 115 may interact with the online system 120 via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

System Architecture

Figure 2:
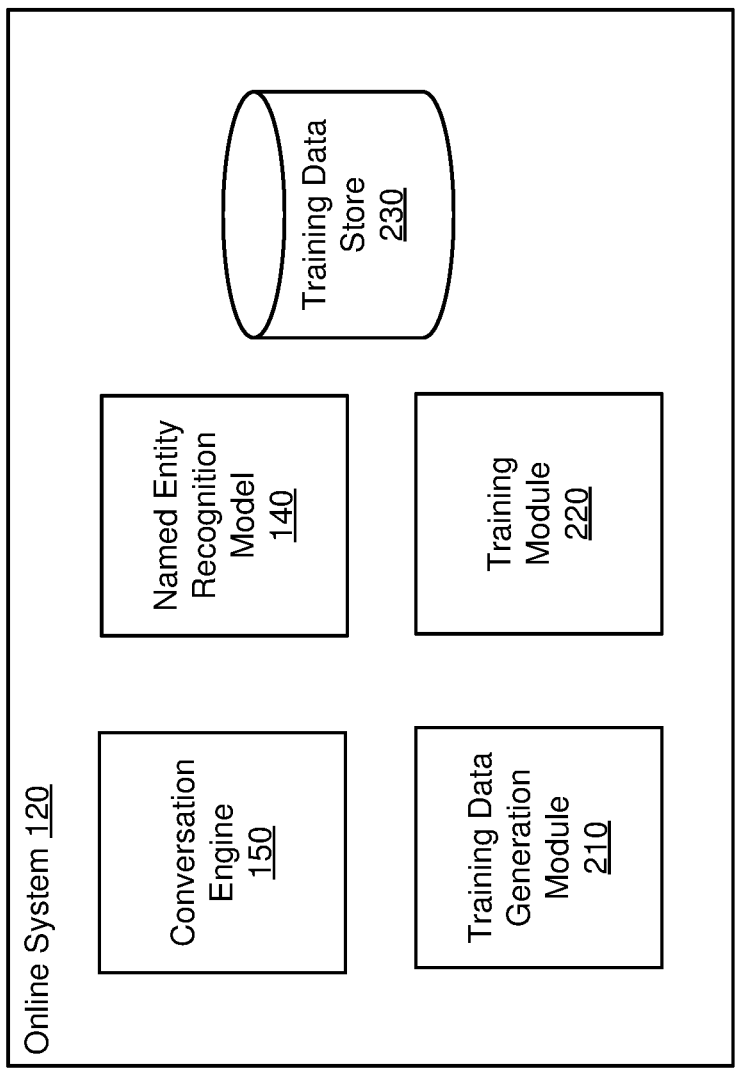
FIG. 2 is a block diagram of the system architecture of an online system, according to an embodiment.

FIG. 2 is a block diagram of the system architecture of an online system, according to an embodiment. The online system 120 includes the conversation engine 150, the named entity recognition model 140, a training data generation module 210, a training module 220, and a training data store 230. Other embodiments can have different and/or other components than the ones described here, and that the functionalities can be distributed among the components in a different manner.

The training data generation module 210 generates training data for training the named entity recognition model 140. For example, a tenant of a multi-tenant system may not have sufficient data to train the named entity recognition model 140. The training data generation module 210 can take a small amount of training data and generates additional training data for training the training data generation module 210. The training data is stored in the training data store 230. The training module 220 trains the named entity recognition model 140 using the training data. The various modules of the online system 120 execute the various processes further described herein.

Generation of Training Dataset Including Contextual Data

Figure 3:
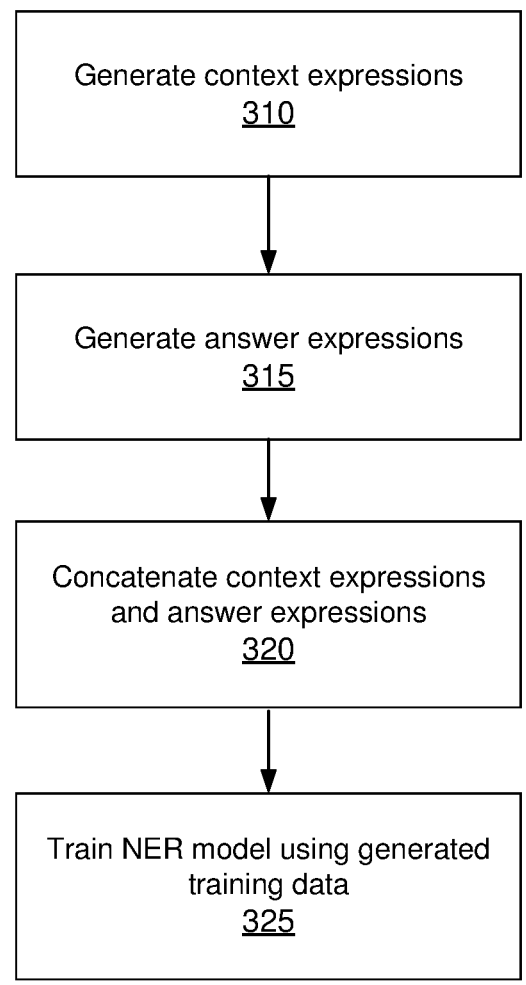
FIG. 3 shows a flowchart illustrating the overall process of generating training data for training the NER model according to an embodiment.

FIG. 3 shows a flowchart illustrating the overall process of generating training data for training the NER model according to an embodiment. Other embodiments can perform the operations of FIG. 3 in different orders. Other embodiments can include different and/or additional steps than the ones described herein.

The training data generation module 210 generates data by performing the steps 310, 315, and 320. The training data generation module 210 generates 310 context expressions. The training data generation module 210 generates 315 answer expressions. The training data generation module 210 concatenates 320 the generated context expressions and the generated answer expressions to generate training data that is stored in the training data store 230. The training module 220 uses the generated training data to train 325 the named entity recognition model 140. The details of these steps are further described herein.

Context Generation

Figure 4:
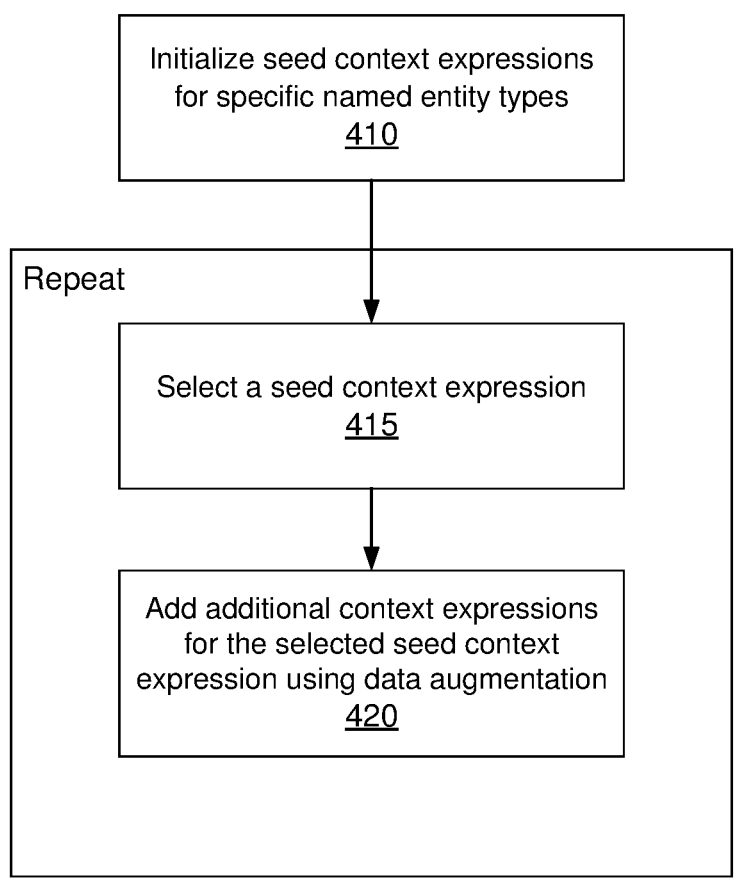
FIG. 4 shows a flowchart illustrating the process of generating context expressions according to an embodiment.

FIG. 4 shows a flowchart illustrating the process of generating 310 context expressions according to an embodiment. Other embodiments can perform the operations of FIG. 4 in different orders. Other embodiments can include different and/or additional steps than the ones described herein.

The training data generation module 210 uses context information for contextual data generation. Accordingly, the training data generation module 210 uses high quality context data that: (1) conveys the information relevant for understanding the user's answer, and (2) covers as many expressions as possible for comprehensive training and evaluation. The use of high quality data improves NER performance.

The process illustrated in FIG. 4 is a two phase context generation method. In the first stage, the training data generation module 210 generates a high quality context seed list. For this stage, the training data generation module 210 receives manually generated commonly used context expressions based on domain knowledge. For example, to improve for PERSON entity detection performance, the training data generation module 210 starts with common expressions that ask for a person's name, such as, "what's your name?", "May I know your name", and so on. For most domains, in this stage, the training data generation module 210 may use 10 to 30 common expressions.

In the second stage, the training data generation module 210 diversifies context expressions. For this stage, the training data generation module 210 diversifies the context expressions with data augmentation techniques. After this stage with more context expressions, the training data generation module 210 trains a better generalized NER model and evaluates the model more fairly.

According to various embodiments, the data augmentation methods used by the system include: (1) Casing Optimization: the training data generation module 210 converts the first letter of multiple words to uppercase, not just the first word of the sentence, e.g. transforming "What's your name"=>["what's your name", "What's Your Name"]. This helps NER model to focus on the context semantics rather than casing. (2) Question Mark: the training data generation module 210 randomly removes question marks from context questions, e.g. transforming "what's your name?"=> ["what's your name"]. This helps the NER model avoid overfitting on question mark. (3) Word switching: The training data generation module 210 switches certain words with other words that could occur in that context, whether or not they are equivalent words "May I know your first name?"=>["May I know your last name?", "Can I know your first name?"]. (4) Phrase re-generation: the training data generation module 210 generates an alternative statement that carries the same meaning but with different words. The system may use a store of equivalent words and phrases to convert a sentence to alternative sentences.

After the first stage, the training data generation module 210 gets high quality context data as it is based on manual generation. However, the number of the expressions may be limited. During the second stage, the training data generation module 210 extends the number of expressions while not losing its information. After the second stage, the training data generation module 210 may get a few hundred meaningful context expressions.

Answer Generation

Figure 5:
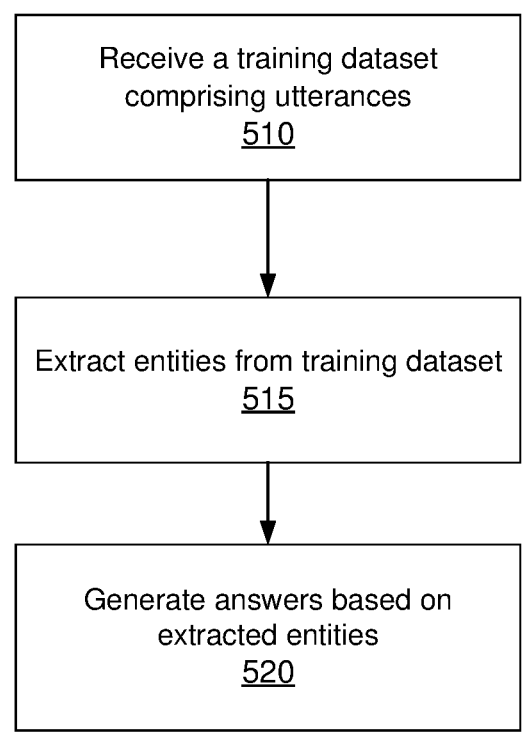
FIG. 5 shows a flowchart illustrating the process of generating answer expressions according to an embodiment.

FIG. 5 shows a flowchart illustrating the process of generating answer expressions according to an embodiment. In addition to generating context, the training data generation module 210 builds a pipeline to generate answers. The training data generation module 210 receives 510 a training dataset comprising utterances. The training data generation module 210 extracts 515 entities from the training dataset. The training data generation module 210 generates 520 answers based on the extracted entities.

For user answers, the training data generation module 210 uses (1) positive answers, which contains a potential entity, and (2) negative answers, which are common user responses but do not contain any entities. Negative data is used during data generation, to prevent the model from overfitting and avoiding learning that any user answer after context contains an entity.

For positive data generation, the training data generation module 210 may start from open public NER datasets. From the open dataset, the training data generation module 210 extracts entities based on the label for specific domains. The extracted entities (e.g., names like "John Doe") could either be used directly as single/short word utterance or combined with simple utterance prefixes, for example, "my name is", "I am", to build a full sentence containing entities.

For negative data generation, the training data generation module 210 executes a process similar to that discussed above for context generation. For first stage, the training data generation module 210 manually generates common negative expressions not containing any entities, e.g. "Ok, sure", "Why?". For second stage, the training data generation module 210 extends the number of negative expressions via data augmentation.

The context may include text that occurs before a term as well as text that occurs after the term. For example, for processing a document the system may look at context after answers.

Context Answer Concatenation

Figure 6:
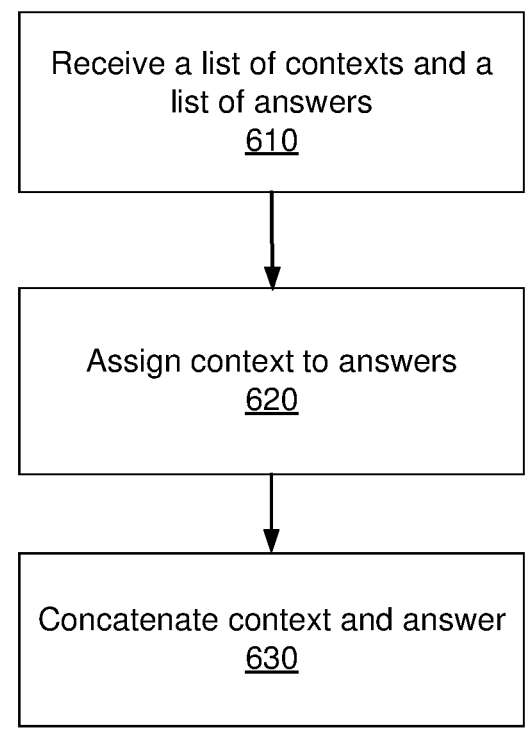
FIG. 6 shows a flowchart illustrating the process of concatenating context and answer expressions to generate training data according to an embodiment.

After the system generates context and user answers, the system concatenates context and answer. FIG. 6 shows a flowchart illustrating the process of concatenating context and answer expressions to generate training data according to an embodiment. The training data generation module 210 receives 610 a list of contexts and answers. The training data generation module 210 assigns each context in the list to different answers and concatenates 630 the respective contexts and answer pairs.

In some embodiments, the NER model is transformer based and the training data generation module 210 puts a separator ([SEP]) token between context and answer. For example, a NER model input is "[CLS] context [SEP] answer [SEP]". Besides [SEP] token, the training data generation module 210 may add additional token or tokens to distinguish between context and answer, for example, "[CLS] [CTX] context [SEP] [ASW] answer [SEP]". The additional tokens help the model to focus on the answer for named entity recognition and simplify post-processing. In some embodiments, the training data generation module 210 directly concatenates the context and the answer via <space> or another white space character, for example, "context <space> answer", and lets the NER model learn to detect the entity.

The training data generation module 210 may use various methods for assigning context to user answer. In an embodiment, the training data generation module 210 performs random assignment. If a system has enough context and answer data, the training data generation module 210 randomly chooses a context to assign to an answer. In an embodiment, the training data generation module 210 performs cross product assignment. If the system has less than a threshold amount of context and answer data, the system iteratively assigns each context to each answer. The generated context answer pair is a cross product of the set of contexts and the set of answers.

As an example, if the training data generation module 210 has two contexts: ["what's your name?", "may I know your name?"] and two answers: ["John", "Jim"], the above methods will generate corresponding results. Random Assignment may generate two inputs "[CLS] what's your name [SEP] Jim" and "[CLS] may I know your name? [SEP] John". Cross Product Assignment generates four inputs: "[CLS] what's your name [SEP] John", "[CLS] may I know your name? [SEP] Jim", "[CLS] what's your name [SEP] John", and "[CLS] may I know your name? [SEP] Jim".

Contextual Model Training

Figure 7:
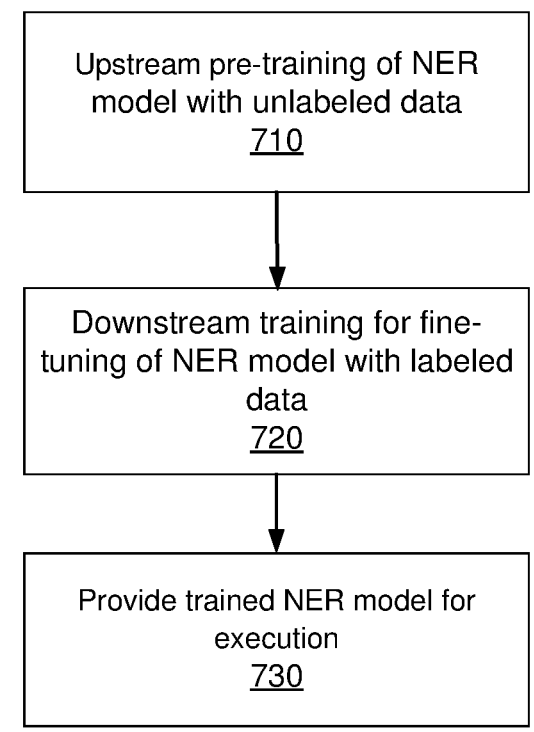
FIG. 7 shows a flowchart illustrating the process of training the NER model according to an embodiment.
Figure 8:
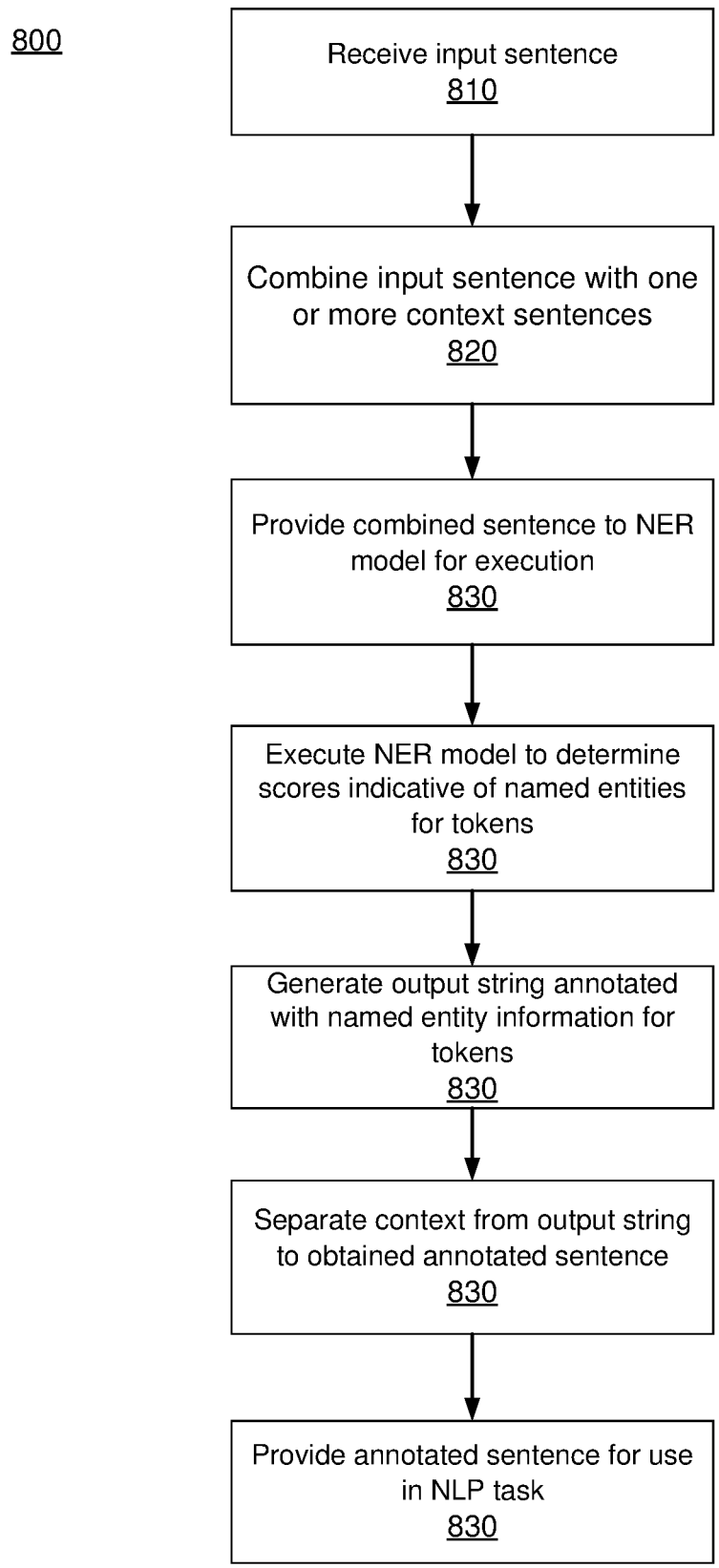
FIG. 8 shows a flowchart illustrating the overall process of using the NER model for processing sentences according to an embodiment.

The training module 220 implements an end-to-end model training pipeline based on deep learning NLP (natural language processing) techniques. FIG. 7 shows a flowchart illustrating the process of training the NER model according to an embodiment. The training module 220 performs an upstream pre-training 710 of the NER model using unlabeled data. The training module 220 further performs downstream training 720 that results in fine-tuning of NER model for specific tasks. The training module 220 provides 730 the trained model for execution for various NLP tasks.

Upstream Pre-Training with Unlabeled Data

Upstream pre-training 710 is used to train a task agnostic base NER model which can be used for multiple downstream tasks. Since the pre-training is task agnostic, the model training uses (1) language model type of loss to train the model to understand the text, and (2) next sentence prediction and contrastive loss type of loss to train the model to understand the relationship between two sentences. An upstream base model pre-trained with such losses generalizes well on multiple different downstream tasks.

Besides improved downstream performances, another advantage of upstream pre-training is that it does not require task specific labels. As the pre-training step 710 uses language model and next sentence prediction or contrastive loss, the training module 220 may use unlabeled contextual data directly. For example, the training module 220 starts with open public conversational datasets.

Downstream Fine-Tuning with Labeled Data

With the pre-trained upstream NER model and labeled data for specific downstream task, the system fine-tunes the NER model for specific downstream task. The labeled data may be generated via the above described methods performed for contextual data generation by the training data generation module 210. For model downstream training for fine-tuning, labeled data is used as an additional dataset.

The system may use an NLP model, for example, a transformer based deep learning model. For the described contextual NER task, the model encodes the input in the format of "[CLS] context [SEP] answer [SEP]". The encoded input is processed by the model and for each token of the encoded input, the model generates an output embedding. The output embedding is used as input for another softmax layer to help decide the entity type tag for each token. The number of the softmax layer outputs corresponds to the label space, the number of the entity types. In an embodiment, the NER model architecture is a stacked model of multiple transformer encoder layers.

The system uses unlabeled data for pre-training of a raw model to obtain a base model that is trained to process conversation and context. The system fine-tunes the base NER model to obtain the final context based NER model. During training the model uses both unlabeled data as well as labeled data.

Contextual Model Serving

To use context as part of the service for performing entity recognition, the system performs following steps (described in further details below): (1) Passing context as part of the request to the NER service; (2) Making decision whether to use context; (3) Passing context along with input text to the model; (4) Preparing the final response.

Passing Context as Part of the Request to the Service

An API (application programming interface) supports an optional parameter that has the context and is passed to the service from the client along with the actual text/utterance being processed. An example request body is as follows:

```
{
    "modelId": "ENTITIES",
    // additional optional parameter - context list
    "context": ["May I have the name of your company to locate your
    account?"],
    "utterance": "MyCompany"
}
```

Decision to Use Context

The system may use the different heuristics to determine whether or not to pass the context to the model. The system may use one or more of (1) utterance length or (2) context intent to determine whether to use the context or not.

According to one embodiment, the system uses the length of the utterance to determine if the system should pass context to the model. Short utterances may not contain enough information to enable the model to predict entities. In some cases, for example, the conversational use case, the short utterance may include only one keyword corresponding to the entity. There is no and no other text surrounding it. To overcome this, the system adds context to utterances that are short in length (typically less than 3 words but the threshold is configurable). The advantage to this approach is that it is simple and easy to implement.

According to another embodiment, the system examines the context and determines whether the information present in the context is required by the model to make a correct prediction for the actual utterance. For each prediction request, the system first uses an ML (machine learning) model to predict whether the context is important for that particular prediction request. The system trains a relatively lightweight binary intent model such as a neural network based model on a curated dataset of contexts for this purpose. For example, the system may use a simple convolutional neural network based model, or even logistic regression. One of the use cases for this is conversational texts. For example, "What is your name?" is a context that has relevant information for the model to make a correct prediction on an utterance, "John Doe". The advantage of this approach is that it is a more sophisticated heuristic, and it helps ensure that the system only adds context when necessary. This helps reduce overall NER model prediction times by supplying shorter utterances.

These two techniques may be used together or separately, depending on an empirical evaluation.

Passing Context Along with Input Text to the Model

The conversation engine 150 or any NLP task performed by a system that executes the NER model executes pre-processing phase to prepare the input to the NER model. If the system decides to use context, the system combines the context and the input text together and passes the combined text to the NER model for prediction. The process used for combining the context and input text depends on the process used for training the NER model. For example, if the NER model was trained using training data that was combined as "[CLS] context [SEP] text [SEP]" the system combines the context and answer using the same approach during execution of the NER model.

Since the NER model is trained to receive context, the system uses the context as supplemental information to predict the entities present in the combined text.

Apart from preparing the input, the system may store the length of the context that is being prepended to the utterance. The system uses the length information as explained in the section below to extract the processed input text from the output.

Preparing the Final Response

The system executes a post-processing step that involves removing the entities present in the context from the output response generated using the NER model.

After the NER model makes the prediction on the combined text that also includes context, the generated response includes the tags/entities present in context as well. Since the requester, for example, the user that invokes the service is interested in the entities present in the input text, the system removes the tags predicted by the model for the context (and any special tokens that were also passed).

To achieve this, the system maintains the length of the context as described in connection with the pre-processing step. The system uses the length to strip off the predictions comprising the tags included in the context portion of the response generated using the NER. Remaining tags/entities represent the tags/entities in the input text/utterance and are provided to the requestor as the final response.

Following is an example illustrating output scores for various terms that occur in a sentence. The B-name score for the term John is high indicating that this term is a B-name named entity.

| Keywords | Score indicating keyword is Not entity | Score indicating keyword is B-Name | Score indicating keyword is I-name. |
|---|---|---|---|
| what. | 0.99 | 0.05 | 0.05 |
| is | 0.99 | 0.05 | 0.05 |
| your | 0.99 | 0.05 | 0.05 |
| name | 0.99 | 0.05 | 0.05 |
| John | 0.05 | 0.99 | 0.05 |

Technical Improvements

The system according to various embodiments improves upon the accuracy of conventional systems. A conventional NER model that does not use the context information to determine the entity information failed on utterances that were short, for example, for a conversation in which the agent asked a question 'what is your name? and the user responded 'Al' or a conversation in which the agent asked a question 'Which company do you work for?' and the user responded salesforce. The conventional NER model failed to detect that the user utterance "Al" in the first example was a person and the user utterance "salesforce" in the second example was an organization. In contrast, the NER model according to embodiments disclosed was able to determine the correct entity with the help of context information. However, the model that uses the context information may be computationally intensive. As a result, the ability of embodiments to determine whether to use the context or use the utterance without the context for performing named entity recognition ensures that the computational expense of using the context is incurred only when necessary, thereby improving the computational efficiency of the process along with the accuracy.

The accuracy of the NER models was measured in terms of F1 score that is determined as a combination of precision and recall for the model. The F1 score is calculated as $F1=2*precision*recall/(precision+recall)$. A conventional NER model was compared with a base NER model that was re-trained with input starting with token "[CLS]" and an ending with token "[SEP]". No contextual data was used for the base model. As shown in the table I, the base NER model performed better than conventional NER model for detecting person entities showing an improvement of 0.33 in F1 score for person entities. The model showed improvement for organization entities also, but not as noticeable.

TABLE I

| Single Word Entity | # of entities | F1 score of conventional NER model | F1 score of base NER model | F1 score improvement |
|---|---|---|---|---|
| PERSON | 1000 | 0.54 | 0.87 | 0.33 |
| ORGANIZATION | 1000 | 0.35 | 0.45 | 0.1 |

Further performance was measured of the base NER model with NER model trained to use contextual data (referred to as the contextual NER model). As shown in table II significant increase (over 30%) in F1 score was found by using contextual NER model compared to base NER model.

TABLE II

| Language | # of entities | F1 score of Base NER Model | F1 score of Contextual NER Model | Absolute F1 Increase |
|---|---|---|---|---|
| English | 2031 | 0.69 | 0.99 | 0.3 |
| French | 2164 | 0.76 | 0.97 | 0.21 |

The techniques disclosed that selectively use the contextual model based on the input utterance or the context improve the execution efficiency of the process. Since use of contextual NER is computationally expensive, the computational efficiency is improved as a result of techniques that avoid invoking the contextual model if equivalent accuracy can be achieved by conventional NER model.

Computer Architecture

Figure 9:
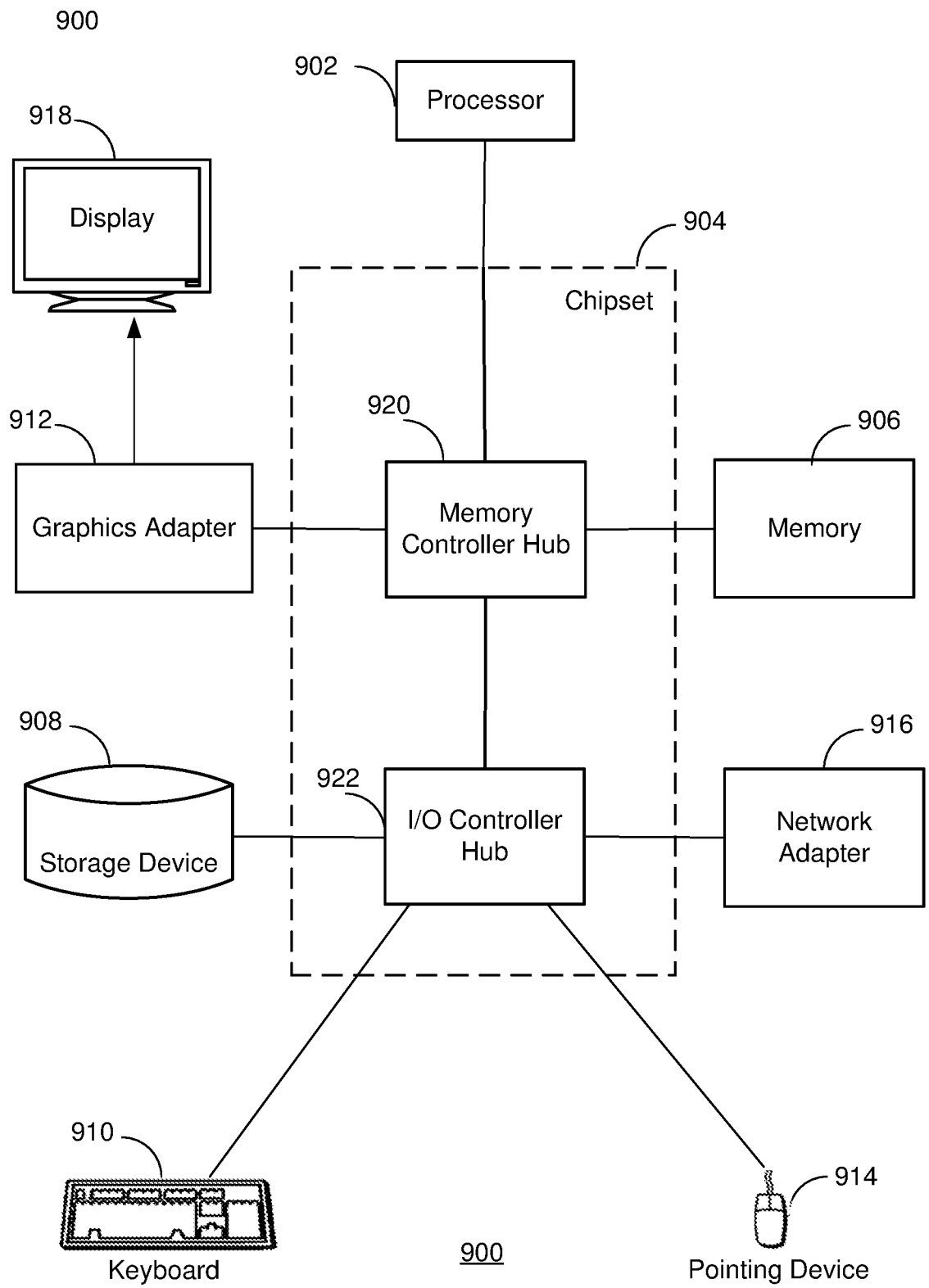
FIG. 9 is a block diagram illustrating a functional view of a typical computer system according to one embodiment.

FIG. 9 is a high-level block diagram illustrating a functional view of a typical computer system for use as one of the entities illustrated in the environment 100 of FIG. 1 according to an embodiment. Illustrated are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O controller hub 922. In another embodiment, the memory 906 is coupled directly to the processor 902 instead of the chipset 904.

The storage device 908 is a non-transitory computer-readable storage medium, such as a hard drive, compact disk read-only memory (CD-ROM), DVD, or a solid-state memory device. The memory 906 holds instructions and data used by the processor 902. The pointing device 914 may be a mouse, track ball, or other type of pointing device, and is used in combination with the keyboard 910 to input data into the computer system 900. The graphics adapter 912 displays images and other information on the display 918. The network adapter 916 couples the computer system 900 to a network.

As is known in the art, a computer 900 can have different and/or other components than those shown in FIG. 9. In addition, the computer 900 can lack certain illustrated components. For example, a computer system 900 acting as a multi-tenant system 120 may lack a keyboard 910 and a pointing device 914. Moreover, the storage device 908 can be local and/or remote from the computer 900 (such as embodied within a storage area network (SAN)).

The computer 900 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 908, loaded into the memory 906, and executed by the processor 902.

The types of computer systems 900 used by the entities of FIG. 1 can vary depending upon the embodiment and the processing power used by the entity. For example, a client device 115 may be a mobile phone with limited processing power, a small display 918, and may lack a pointing device 914. The multi-tenant system 120, in contrast, may comprise multiple blade servers working together to provide the functionality described herein.

Alternative Embodiments

It is to be understood that the Figures and descriptions of the present invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of the above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer implemented method for generating a training dataset for machine learning based models for natural language processing, the method comprising:
receiving a set of natural language phrases;
generating a plurality of user responses from the set of natural language phrases, the generating comprising:
selecting a natural language phrase from the set of natural language phrases;
processing the selected natural language phrase to extract an entity of a particular named entity type;
generating a user response associated with the particular named entity type based on the extracted entity; and
determining whether to collect a plurality of context strings, each context string associated with a named entity type, wherein the determining is based on whether a length of a natural language phrase associated with the named entity type is shorter than a threshold length;
receiving, based on determining whether to collect the plurality of context strings, the plurality of context strings;
generating the training dataset by repeating for a named entity type:
selecting a context string associated with the named entity type from the plurality of context strings;
selecting a user response associated with the named entity type from the plurality of user responses, wherein the selecting is random in response to an amount of context strings in the plurality of context strings and an amount of user responses in the plurality of user responses being above a threshold amount, and wherein the selecting is according to a pattern such that each context string in the plurality of context strings is selected with each user response in the plurality of user responses in response to the amount of context strings in the plurality of context strings and the amount of user responses in the plurality of user responses being below a threshold amount; and
adding a pair of the selected context string and the selected user response to the training dataset; and
using the training dataset for training a machine learning based model for use in named entity recognition.

2. The computer implemented method of claim 1, wherein the machine learning based model is configured to receive as input, a combined string obtained by combining a context string and a user response, wherein different portions of the combined string are identified using separator tokens.

3. The computer implemented method of claim 1, further comprising, generating context sentences by performing:
receiving a set of seed context sentences, each seed context associated with a named entity type; and
for each of one or more seed context sentences, generating a plurality of context sentences by modifying the seed context sentence.

4. The computer implemented method of claim 3, wherein modifying the seed context sentence comprises converting a first letter of multiple keywords of the seed context sentence to uppercase.

5. The computer implemented method of claim 3, wherein modifying the seed context sentence comprises adding one or more punctuation marks to the seed context sentence.

6. The computer implemented method of claim 3, wherein modifying the seed context sentence comprises switches one or more words of the seed context with other words that could occur in that context.

7. The computer implemented method of claim 3, wherein modifying the seed context sentence comprises generating an alternative statement that has equivalent meaning using different words.

8. The computer implemented method of claim 1, wherein the machine learning based model is used for generating responses in a conversation engine in response to a prediction of a pretrained binary intent model that a context of a conversation of the conversation engine is relevant.

9. A non-transitory computer readable storage medium storing instructions that when executed by a computer processor, cause the computer processor to perform steps comprising:
receiving a set of natural language phrases;
generating a plurality of user responses from the set of natural language phrases, the generating comprising:
selecting a natural language phrase from the set of natural language phrases;
processing the selected natural language phrase to extract an entity of a particular named entity type;
generating a user response associated with the particular named entity type based on the extracted entity; and
determining whether to collect a plurality of context strings, each context string associated with a named entity type, wherein the determining is based whether on a length of a natural language phrase associated with the named entity type is shorter than a threshold length;
receiving, based on determining whether to collect the plurality of context strings, the plurality of context strings;
generating a training dataset by repeating for a named entity type:
selecting a context string associated with the named entity type from the plurality of context strings;
selecting a user response associated with the named entity type from the plurality of user responses, wherein the selecting is random in response to an amount of context strings in the plurality of context strings and an amount of user responses in the plurality of user responses being above a threshold amount, and wherein the selecting is according to a pattern such that each context string in the plurality of context strings is selected with each user response in the plurality of user responses in response to the amount of context strings in the plurality of context strings and the amount of user responses in the plurality of user responses being below a threshold amount; and
adding a pair of the selected context string and the selected user response to the training dataset; and
using the training dataset for training a machine learning based model for use in named entity recognition.

10. The non-transitory computer readable storage medium of claim 9, wherein the machine learning based model is configured to receive as input, a combined string obtained by combining a context string and a user response, wherein different portions of the combined string are identified using separator tokens.

11. The non-transitory computer readable storage medium of claim 9, further comprising, generating context sentences by performing:
   receiving a set of seed context sentences, each seed context associated with a named entity type; and
   for each of one or more seed context sentences, generating a plurality of context sentences by modifying the seed context sentence.

12. The non-transitory computer readable storage medium of claim 11, wherein modifying the seed context sentence comprises converting a first letter of multiple keywords of the seed context sentence to uppercase.

13. The non-transitory computer readable storage medium of claim 11, wherein modifying the seed context sentence comprises adding one or more punctuation marks to the seed context sentence.

14. The non-transitory computer readable storage medium of claim 11, wherein modifying the seed context sentence comprises switches one or more words of the seed context with other words that could occur in that context.

15. The non-transitory computer readable storage medium of claim 11, wherein modifying the seed context sentence comprises generating an alternative statement that has equivalent meaning using different words.

16. The non-transitory computer readable storage medium of claim 11, wherein the machine learning based model is used for generating responses in a conversation engine.

17. A computer system comprising:
   a computer processor; and
   a non-transitory computer readable storage medium storing instructions that when executed by a computer processor, cause the computer processor to perform steps comprising:
      receiving a set of natural language phrases;
      generating a plurality of user responses from the set of natural language phrases, the generating comprising:
         selecting a natural language phrase from the set of natural language phrases;
         processing the selected natural language phrase to extract an entity of a particular named entity type;
         generating a user response associated with the particular named entity type based on the extracted entity; and
      determining whether to collect a plurality of context strings, each context string associated with a named entity type, wherein the determining is based on whether a length of a natural language phrase associated with the named entity type;
      receiving, based on determining whether to collect the plurality of context strings, the plurality of context strings;
      generating a training dataset by repeating for a named entity type:
         selecting a context string associated with the named entity type from the plurality of context strings;
         selecting a user response associated with the named entity type from the plurality of user responses, wherein the selecting is random in response to an amount of context strings in the plurality of context strings and an amount of user responses in the plurality of user responses being above a threshold amount, and wherein the selecting is according to a pattern such that each context string in the plurality of context strings is selected with each user response in the plurality of user responses in response to the amount of context strings in the plurality of context strings and the amount of user responses in the plurality of user responses being below a threshold amount; and
         adding a pair of the selected context string and the selected user response to the training dataset; and
      using the training dataset for training a machine learn-ing based model for use in named entity recognition.

18. The computer system of claim 17, wherein the machine learning based model is configured to receive as input, a combined string obtained by combining a context string and a user response, wherein different portions of the combined string are identified using separator tokens.

19. The computer system of claim 17, further comprising, generating context sentences by performing:
   receiving a set of seed context sentences, each seed context associated with a named entity type; and
   for each of one or more seed context sentences, generating a plurality of context sentences by modifying the seed context sentence.

20. The computer system of claim 17, wherein the machine learning based model is used for generating responses in a conversation engine.

* * * * *